United States Patent
Choi et al.

(10) Patent No.: US 8,948,779 B1
(45) Date of Patent: Feb. 3, 2015

(54) COMMUNICATION PROFILES FOR MOBILE DEVICES BASED ON HISTORICAL CHARACTERISTICS

(75) Inventors: Heesook Choi, Foster City, CA (US); Kosol Jintaseranee, San Jose, CA (US); Soshant Bali, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 118 days.

(21) Appl. No.: 13/364,032

(22) Filed: Feb. 1, 2012

(51) Int. Cl.
*H04W 24/00* (2009.01)

(52) U.S. Cl.
USPC .................................. 455/456.1; 455/456.4

(58) Field of Classification Search
CPC .................. H04W 4/02; H04W 4/025–4/028; H04W 64/00
USPC ............... 455/404.2, 405, 421, 422.1, 456.1, 455/456.2, 456.3, 456.4
See application file for complete search history.

(56) References Cited

U.S. PATENT DOCUMENTS

| | | | |
|---|---|---|---|
| 6,385,454 B1 * | 5/2002 | Bahl et al. | 455/450 |
| 7,242,920 B2 | 7/2007 | Morris | |
| 8,073,460 B1 * | 12/2011 | Scofield et al. | 455/456.1 |
| 2002/0080719 A1 | 6/2002 | Parkvall et al. | |
| 2006/0270385 A1 | 11/2006 | Morris | |
| 2007/0298762 A1 | 12/2007 | Morris | |
| 2008/0248822 A1 * | 10/2008 | Jarvinen et al. | 455/509 |
| 2009/0143078 A1 * | 6/2009 | Tu et al. | 455/456.3 |
| 2009/0286526 A1 * | 11/2009 | Matsunaga | 455/421 |
| 2009/0312005 A1 * | 12/2009 | Mukundan et al. | 455/422.1 |
| 2010/0161720 A1 * | 6/2010 | Colligan et al. | 709/203 |
| 2010/0322124 A1 | 12/2010 | Luoma et al. | |
| 2010/0323715 A1 * | 12/2010 | Winters | 455/456.1 |
| 2011/0153728 A1 * | 6/2011 | Einarsson et al. | 709/203 |
| 2011/0201350 A1 * | 8/2011 | Das et al. | 455/456.1 |

* cited by examiner

*Primary Examiner* — Magdi Elhag (57) ABSTRACT

Systems, devices, methods, and software for operating a mobile communication device are provided herein. In a first example, a method of operating a mobile communication device is provided. The method includes monitoring a current movement of the mobile communication device, identifying a projected location of the mobile communication device based the current movement and past mobility information corresponding to past movement of the mobile communication device, and processing past performance information corresponding to past communication performance between the mobile communication device and a communication network at the projected location to determine a communication profile for wireless communications with the communication network at the projected location.

14 Claims, 4 Drawing Sheets

COMMUNICATION PROFILES FOR MOBILE DEVICES BASED ON HISTORICAL CHARACTERISTICS

TECHNICAL FIELD

Aspects of the disclosure are related to the field of mobile and wireless communications, and in particular, mobile communication devices in wireless communication networks.

TECHNICAL BACKGROUND

Wireless communication networks typically provide wireless access to communication services over a geographic area. Mobile user devices, such as mobile phones, can receive the wireless access from the wireless communication network to place calls, receive text messaging, or access the Internet, among other activities. These mobile devices are typically portable devices, and able to be moved throughout the geographic area provided by the wireless communication network.

In some example mobile devices, user software applications are employed which periodically exchange data with other devices across the wireless communication network or the Internet. This periodic data can include email notifications, social networking updates, or other periodically-exchanged data. However, these periodic communications typically only consider the periodic time or notifications of pending data to prompt the exchanging of the associated data. However, the mobile devices can be transported throughout a geographic area with varying wireless signal quality, and thus expend unnecessary energy and time attempting to exchange this periodic data during poor signal quality geographic regions.

Overview

Systems, devices, methods, and software for operating a mobile communication device are provided herein. In a first example, a method of operating a mobile communication device is provided. The method includes monitoring a current movement of the mobile communication device, identifying a projected location of the mobile communication device based the current movement and past mobility information corresponding to past movement of the mobile communication device, and processing past performance information corresponding to past communication performance between the mobile communication device and a communication network at the projected location to determine a communication profile for wireless communications with the communication network at the projected location.

In another example, a mobile communication device is provided. The mobile communication device includes a position system configured to monitor a current movement of the mobile communication device, and a processing system configured to identify a projected location of the mobile communication device based the current movement and past mobility information corresponding to past movement of the mobile communication device. The processing system is also configured to process past performance information corresponding to past communication performance between the mobile communication device and a communication network at the projected location to determine a communication profile for wireless communications with the communication network at the projected location.

In another example, a computer-readable medium having program instructions stored thereon for operating a mobile communication device is provided. When executed by the mobile communication device, the program instructions direct the mobile communication device to monitor a current movement of the mobile communication device, identify a projected location of the mobile communication device based the current movement and past mobility information corresponding to past movement of the mobile communication device, and process past performance information corresponding to past communication performance between the mobile communication device and a communication network at the projected location to determine a communication profile for wireless communications with the communication network at the projected location.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
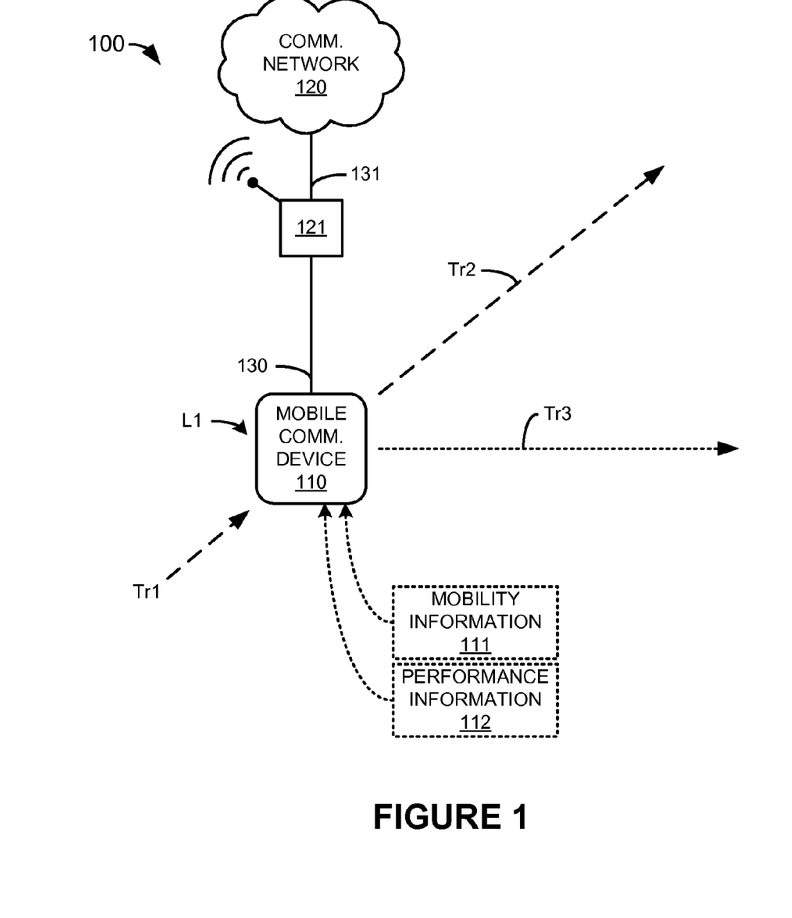
FIG. 1 is a system diagram illustrating a communication system.

FIG. 1 is a system diagram illustrating communication system 100. Communication system 100 includes mobile communication device 110, communication network 120, and wireless access node 121. Wireless access node 121 is shown in FIG. 1 as an optional example of a first wireless access region in communication system 100. Mobile communication device 110 and wireless access node 121 initially communicate over wireless link 130. Wireless access node 121 and communication network 120 communicate over link 131. Further wireless access nodes or wireless communication coverage areas may be included in FIG. 1, but are omitted in this example for clarity.

Figure 2:
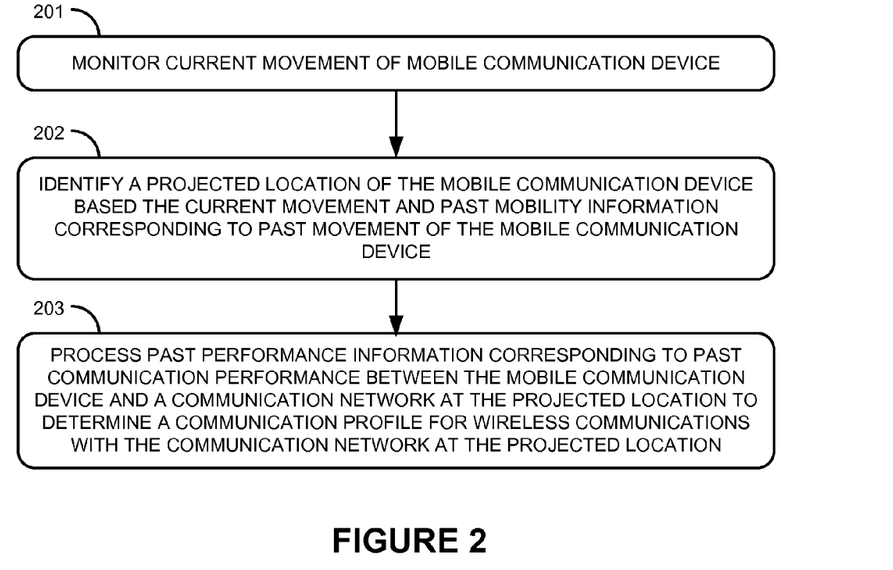
FIG. 2 is a flow diagram illustrating a method of operation of a mobile communication device.

FIG. 2 is a flow diagram illustrating a method of operation of mobile communication device 110. The operations of FIG. 2 are referenced herein parenthetically. Referring back to FIG. 1, mobile communication device 110 is initially located at a first location, location L1. To arrive at location L1, mobile communication device 110 traverses a first trajectory, Tr1 due to current movement of mobile communication device 110. While at L1, mobile communication device 110 receives wireless access to communication services, such as through wireless access node 121 over wireless link 130.

Referring now to the operations of FIG. 2, mobile communication device 100 monitors (201) current movement of mobile communication device 110. In this example, the current movement can include movement trajectory T1. The current movement can be determined by a positioning system of mobile communication device 110, or received as movement information provided by external position determination systems.

Mobile communication device 110 identifies (202) a projected location of mobile communication device 110 based the current movement and past mobility information corresponding to past movement of mobile communication device 110. In FIG. 1, two of the many possible paths for mobile communication device 110 are shown, namely Tr2 and Tr3. Based on the current movement or momentum of mobile communication device 110 alone, path Tr2 may initially appear as the most likely path for mobile communication device 110. However, past mobility information 111 is processed along with the current movement to identify a projected location as path Tr3 instead of path Tr2.

Past mobility information 111 can include information related to previous movements and positional activity of mobile communication device 110, such as previous routes or paths taken by mobile communication device 110. For example past mobility information 111 may include geographic information, trajectory information, roads, streets, or other pathways previously traveled by mobile communication device 110, including combinations thereof. Past mobility information 111 may be associated with past communication sessions of mobile communication device 110, or may include statistical information on mobility or motion of mobile communication device 110. Current movement of mobile communication device 110 is typically determined by sensory or monitoring equipment and systems for determining a present movement, trajectory, heading, speed, momentum, or the like, of mobile communication device 110. On the other hand, past mobility information is typically determined from a data storage element, such as a database, map, table, and not from present sensory information.

Mobile communication device 110 processes (203) past performance information corresponding to past communication performance between mobile communication device 110 and communication network 120 at the projected location to determine a communication profile for wireless communications with communication network 120 at the projected location. In this example, the projected location for mobile communication device 110 is along trajectory Tr3. Mobile communication device 110 processes past performance information 112 that is correlated with trajectory Tr3 to determine the communication profile along the projected path of Tr3. For example, performance information 112 can correspond to communication performance during a previous communication session, such as a previous phone call, data transfer, or text message. The performance of the previous communication session can then be correlated to the projected location of mobile communication device 110, such as along trajectory Tr3 in this example.

The communication profile can correspond to scheduling communications between mobile communication device 110 and communication network 120. For example, if the past performance information 112 indicates poor communication quality within certain zones along trajectory Tr3, then communications between mobile communication device 120 and communication network 120 can be scheduled to be minimized during the projected poor communication quality zones and maximized during projected good communication signal quality zones. Advantageously, by scheduling communications to consider past communication performance along a projected path, then mobile communication device 110 can reduce signal transmission and reception power and amplification requirements during projected poor signal quality zones.

Figure 3:
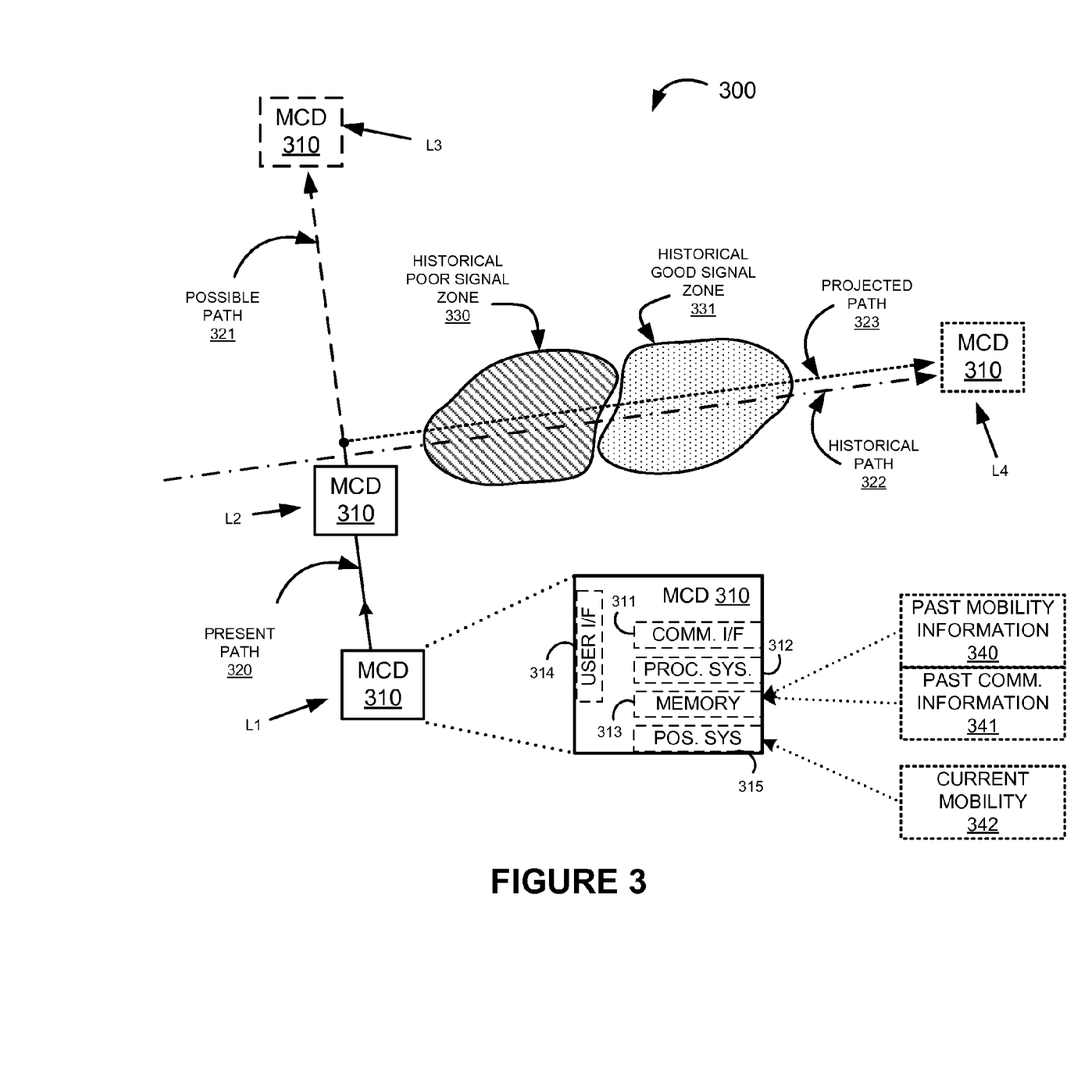
FIG. 3 is a system diagram illustrating a communication system.

FIG. 3 is a system diagram illustrating communication system 300. Communication system 300 includes mobile communication device (MCD) 310, historical poor signal zone 330, and historical good signal zone 331. Although not shown in FIG. 3 for clarity, communication system 300 can also include wireless access nodes and communication equipment and systems found in a wireless communication network, such as that indicated in FIG. 1. MCD 310 may be an example of mobile communication device 110 found in FIG. 1, although mobile communication device 110 can use other configurations.

MCD 310 includes communication interface 311, processing system 312, memory 313, user interface 314, and positioning system 315. In operation, processing system 312 is operatively linked to communication interface 311, memory 313, user interface 314, and positioning system 315. Processing system 312 is capable of executing software stored in memory 313. When executing the software, processing system 312 drives MCD 310 to operate as described herein.

Processing system 312 may be implemented within a single processing device but may also be distributed across multiple processing devices or sub-systems that cooperate in executing program instructions. Examples of processing system 312 include general purpose central processing units, microprocessors, application specific processors, and logic devices, as well as any other type of processing device.

Communication interface 311 may include communication connections and equipment that allows for communication with wireless access nodes of a wireless communication system. Examples include antennas, power amplifiers, RF circuitry, transceivers, and other communication circuitry.

Memory 313 may comprise any storage media readable by processing system 312 and capable of storing software. Memory 313 may include volatile and nonvolatile, removable and non-removable media implemented in any method or technology for storage of information, such as computer readable instructions, data structures, program modules, or other data. Memory 313 may be implemented as a single storage device but may also be implemented across multiple storage devices or sub-systems. Memory 313 may comprise additional elements, such as a controller, capable of communicating with processing system 312. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 313 may comprise computer program instructions, firmware, or some other form of machine-readable processing instructions having processes that when executed by processing system 312 direct MCD 310 to operate as described herein. For example, software drives MCD 310 to monitor current mobility 342, identify a projected location based on current movement and past mobility information 340, and process past performance information 341 and the projected location to identify a communication profile for the projected location, among other operations. The software may also include user software applications. The software may be implemented as a single application or as multiple applications. In general, the software may, when loaded into processing system 312 and executed, transform processing system 312 from a general-purpose device into a special-purpose device customized as described herein.

User interface 314 may have input devices such as a keyboard, a mouse, a voice input device, or a touch input device, and comparable input devices. Output devices such as a display, speakers, printer, and other types of output devices may also be included with user interface 314. User interface 314 may also be considered to be an integration of MCD 310 with software elements, such as operating system and application software. For instance, a user may navigate an application view using a user device, such as a touchpad, or place a voice call using a keypad. The interface functionality provided by the integration of user interface software with user interface devices can be understood to be part of user interface 314.

Position system 315 determines current mobility 342 of MCD 310, such as determining a position of MCD 310 or receiving a position of MCD 310. Position system 315 may interact with external systems to determine or receive a position of MCD 310, such as satellite positioning equipment or terrestrial positioning equipment. In some examples, position system 315 includes accelerometer circuitry, a global positioning system (GPS) receiver, triangulation equipment, gyroscope circuitry, compass circuitry, or other elements. Position system 315 is operatively coupled with processing system 312, either directly or through memory 313. Current mobility 342 determined or received by position system 315 can include a geographic position, road or street address, heading, speed, or acceleration, among other information.

Figure 4:
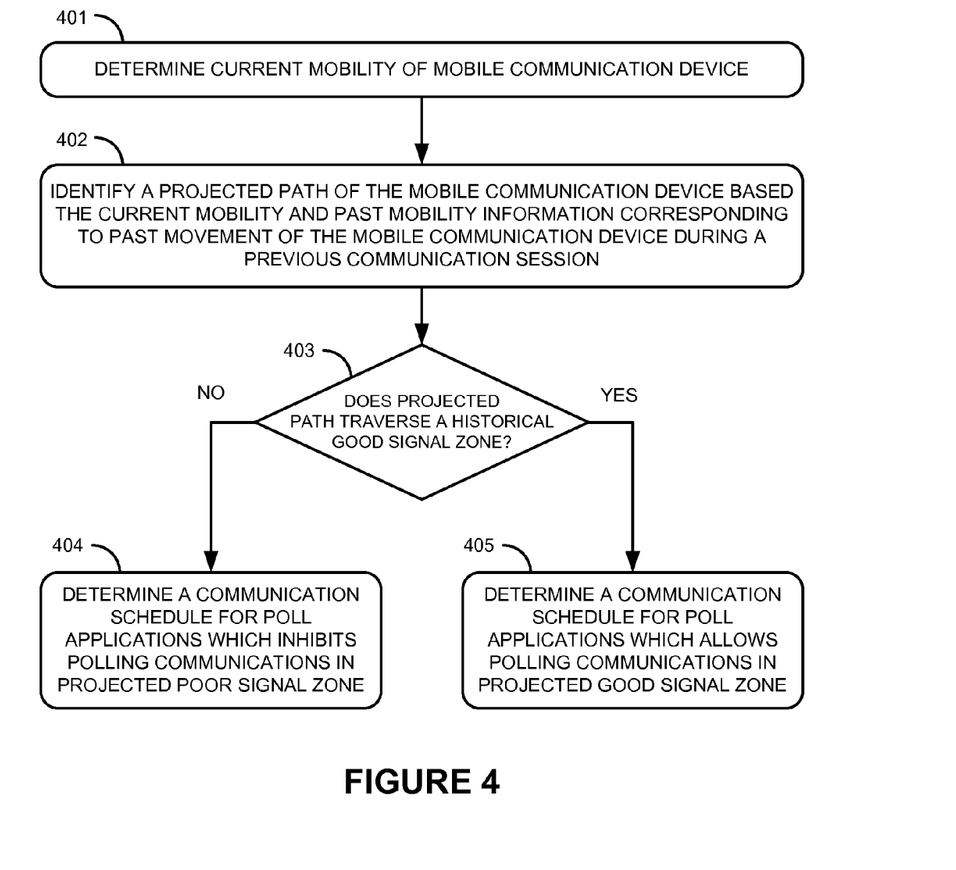
FIG. 4 is a flow diagram illustrating a method of operation of a mobile communication device.

FIG. 4 is a flow diagram illustrating a method of operation of mobile communication device (MCD) 310. The operations of FIG. 4 are referenced herein parenthetically. In FIG. 4, MCD 310 determines (401) current mobility of MCD 310. The current mobility can include present path 320 shown in FIG. 3. Present path 320 indicates a path or trajectory of MCD 310 from a first location, L1, to a second location L2. The locations L1 and L2 associated with present path 320 may be determined as current mobility 342, and can correspond to geographic positions which are employed to determine path 320. In other examples, current mobility 342 may include a road, street, or trail presently being traveled by MCD 310, and the current mobility can be correlated to a map or database of geographic features to determine present path 320. Current mobility 342 can include several sequential indications of a location of MCD 310 to determine a path, trajectory, or geographical feature associated with travel of MCD 310. Current mobility 342 can be determined by position system 315 of MCD 310 such as with a GPS receiver, by triangulation of wireless signals, or by dead-reckoning using on-board sensors such as electronic accelerometers, gyroscopes, or compasses. Current mobility 342 can alternatively be determined by systems external to MCD 310, such as by elements of a wireless communication system, wireless access nodes, or other systems, and the current mobility or associated information can be transferred for delivery to MCD 310.

MCD 310 identifies (402) a projected path of MCD 310 based on the current mobility and past mobility information corresponding to past movement of MCD 310 during a previous communication session. In FIG. 3, possible path 321 is shown as a continuation of present path 320 in a linear fashion, such as by extrapolating a present momentum of MCD 310 into the future. Possible path 321 leads to possible location L3 for MCD 310. However, past mobility information 340 is processed along with current mobility 342 to determine projected path 323. In this example, projected path 323 coincides with historical path 322 leading to projected location L4 for MCD 310. Historical path 322 indicates a previous path taken by MCD 310 and is indicated in past mobility information 340. Historical path 322 may correspond to a path taken on a previous day by MCD 310. Past mobility information 340 can be stored within memory 313 as a database or map information indicating previous travel by MCD 310. This previous travel can coincide or be associated with a previous communication session of MCD 310, such as a previous voice call, data session, or text messaging. In other examples, this previous travel can be recorded by monitoring a series of locations of MCD 310 from a previous time, such as a previous day, separate from or coincident with a communication session of MCD 310.

As shown in FIG. 3, projected path 323 for MCD 310 diverts significantly from the line indicated by present path 320 leading to possible path 321. Without past mobility information 340, projected path 323 of MCD 310 would not indicate travel along historical path 322 and instead may indicate travel along possible path 321. Also, historical path 322 crosses two example zones of wireless signal quality, namely historical poor signal zone 330 and historical good signal zone 331. Information related to these historical signal zones is included in past communication information 341. This past communication information 341 can include information on communication status or quality during travel through the associated signal zones, and the signal zones themselves can be formulated by information monitored by MCD 310 during previous travel along historical path 322. For example, if during a previous communication session MCD 310 experienced poor communication quality or poor signal quality while traveling along the portion of historical path 322 which crosses zone 330, then MCD 310 can indicate poor signal quality for zone 330 in past communication information 341. Likewise, if during a previous communication session MCD 310 experienced good communication quality or good signal quality while traveling along the portion of historical path 322 which crosses zone 331, then MCD 310 can indicate good signal quality for zone 331 in past communication information 341. Although terms like 'good' and 'poor' are used herein, it should be understood that the associated communication quality or signal quality can be indicated in decibels, RF signal quality, watts, data rate, bandwidth, required transmit power, detected receive power, or other discrete measurement indicator. It should also be understood that 'good' signal quality is of a higher relative nature than 'poor' signal quality and these terms are merely used herein for readability. In some examples, 'poor' signal quality or communication quality refers to signal quality or communication quality below a quality threshold, while 'good' signal quality or communication quality refers to signal quality or communication quality above a quality threshold. These zones 330-331 can be defined by geographic coordinates, a database of signal quality along certain paths, or can be associated with coverage areas of certain wireless access nodes, base stations, sectors, or the like. A map of these zones can be assembled during previous activities and travel of MCD 310, such as over a period of time or several communication sessions, and stored within memory 313 of MCD 310 or other elements of MCD 310.

If the projected path does not traverse a historical good signal zone (403), then MCD 310 determines (404) a communication schedule for poll applications which inhibits polling communications in the projected poor signal zone. However, if the projected path does traverse a historical good signal zone (403), then MCD 310 determines (405) a communication schedule for poll applications which allows polling communications in the projected good signal zone. In the example shown in FIG. 3, projected path 323 indicates a path initially through historical poor signal zone 330 and then through historical good signal zone 331. Thus, zones of both poor and good signal quality are projected to be encountered along projected path 323 based on previous activities of MCD 310 while traveling historical path 322 during a previous time or previous communication session. Based on past communication information 341 and past mobility information 340, MCD 310 determines a communication schedule for poll applications which inhibits polling communications during the projected travel of MCD 310 through zone 330 and allows polling communications during the projected travel of MCD 310 through zone 331.

In examples of MCD 310, such as smart phones, tablet computers, or gaming devices, user software applications are employed which periodically exchange user data or other communications wirelessly with other devices across a wireless communication network or the Internet. This periodic data can include email notifications, social networking updates, tweets, personal messaging, or other periodically exchanged data. The periodic data can include 'pulled' data, by which MCD 310 initiates transfer, or can include 'pushed' data, by which another device or system than MCD 310 initiates transfer. However, these periodic communications typically only consider the periodic time or notifications of pending data to prompt the exchanging of the associated data, thus ignoring network or signal conditions. In the examples discussed herein, historical mobility information and historical signal quality is considered in allowing or inhibiting these user application communications. Communications are scheduled according to projected signal conditions along a projected path of MCD 310, preventing communications when signal quality is projected to be poor, such as below a communication quality threshold, and allowing communications when signal quality is projected to be good, such as above a communication quality threshold. Inhibiting or preventing the communications can include disabling, buffering, delaying, or pausing communications until a desired signal zone is projected to be encountered. The communication schedule can thus correspond to a geographic location threshold, where communications are resumed once MCD 310 enters into the geographic zone indicated by the desired zone.

Although periodic polled user communications are discussed above regarding the inhibiting or allowing of communications according to a schedule, other parameters can be scheduled according to projected path 323. For example, MCD 310 can schedule communication parameters such as coding schemes, power requirements, transmit levels, amplification levels, or other communication parameters according to previously encountered signal conditions of zones 330-331. In further examples, MCD 310 initially communicates with a first wireless communication protocol or frequency spectrum at location L2, and based on projected path 323 schedules a change to a different wireless communication protocol or frequency spectrum during projected travel through zone 330 and reverts to the first wireless communication protocol or frequency spectrum during projected travel through zone 331.

Referring back to FIG. 1, mobile communication device 110 comprises transceiver circuitry and communication elements. The transceiver circuitry typically includes amplifiers, filters, modulators, and signal processing circuitry. Mobile communication device 110 can also include user interface systems, memory devices, non-transitory computer-readable storage mediums, software, processing circuitry, or some other communication components. Mobile communication device 110 can be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Mobile communication device 110 can include multiple transceiver portions or antenna portions, among other circuit and equipment elements, for communicating wirelessly with multiple wireless communication networks, using different wireless communication modes or wireless communication protocols.

Communication network 120 comprises communication and control systems for providing access to communication services for user devices, such as mobile communication device 110. In some examples, communication network 120 includes equipment to provide wireless access to communication services within different coverage areas to user devices, route communications between content providers and user devices, and receive and process registration and content requests, among other operations. Communication network 120 may also comprise wireless access nodes, wireless access node controllers, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Wireless access node 121 is associated with communication network 120, and provides wireless links for wireless access to the communication services of wireless communication network 120. Wireless access node 121 comprises RF communication and control circuitry, transceivers, and antennas, as well as wireless communications equipment capable of communicating with and providing wireless access within a wireless coverage area to communication services for wireless communication devices, such as mobile communication device 110. The RF communication circuitry typically includes amplifiers, filters, RF modulators, transceivers, and signal processing circuitry. Wireless access node 121 may also comprise a base station or base transceiver station (BTS).

Communication link 131 uses metal, glass, optical, air, space, or some other material as the transport media. Communication link 131 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 131 can be a direct link or may include intermediate networks, systems, or devices, and can include a logical network link transported over multiple physical links.

Wireless link 130 uses the air or space as the transport media. Wireless link 130 may use various protocols, such as Code Division Multiple Access (CDMA), Evolution-Data Optimized (EVDO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although one main wireless link 130 is shown in FIG. 1, it should be understood that wireless link 130 is merely illustrative to show communication modes or wireless access pathways for mobile communication device 110. In other examples, further wireless links can be shown, with portions of the further wireless links shared and used for different communication sessions and associated overhead communications.

Communication links 130-131 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a mobile communication device, the method comprising:
   in the mobile communication device, monitoring current movement of the mobile communication device;
   in the mobile communication device, identifying a projected path of the mobile communication device based on the current movement and past mobility information corresponding to past movement of the mobile communication device; and
   in the mobile communication device, processing past performance information corresponding to past communication performance between the mobile communication device and a communication network on the projected path to determine communication performance along the projected path,
      if the communication performance at locations along the projected path does not meet a predetermined communication service quality, then disabling periodic polled communications initiated by different ones of applications of the mobile communication device; or
      if the communication performance at the locations along the projected path does meet the predetermined communication service quality, then allowing the periodic polled communications initiated by the different ones of applications of the mobile communication device.

2. The method of claim 1, wherein the current movement is determined by a position sensor of the mobile communication device, and the past mobility information is provided by a database comprising past movement data of the mobile communication device.

3. The method of claim 1, wherein the past performance information corresponds to communications between the mobile communication device and the communication network during a previous communication session between the mobile communication device and the communication network.

4. The method of claim 1, wherein the past performance information corresponds to communications between the mobile communication device and the communication network during the past movement.

5. The method of claim 1, wherein allowing the periodic polled communications initiated by the different ones of applications of the mobile communication device comprises causing the exchange of user data between the communication network and the mobile communication device at a time when the user data would not have otherwise been exchanged.

6. The method of claim 1, wherein the projected path comprises a path different than a path indicated by current momentum and direction of the mobile communication device.

7. A mobile communication device comprising:
   a position system configured to monitor a current movement of the mobile communication device;
   a processing system configured to identify a projected path of the mobile communication device based on the current movement and past mobility information corresponding to past movement of the mobile communication device; and
   the processing system configured to process past performance information corresponding to past communication performance between the mobile communication device and a communication network on the projected path to determine a communication profile for the mobile communication device on the projected path, wherein the communication profile indicates communication performance at locations along the projected path:
      if the communication performance at the locations along the projected path does not meet a predetermined communication service quality, then the processing system configured to disable periodic polled communications initiated by different ones of applications of the mobile communication device; or
      if the communication performance at the locations along the projected path does meet the predetermined communication service quality, then the processing system configured to allow the periodic polled communications initiated by the different ones of applications of the mobile communication device.

8. The mobile communication device of claim 7, further comprising:
   a position sensor configured to determine the current movement; and
   a database comprising past movement data of the mobile communication device configured to provide the past mobility information.

9. The mobile communication device of claim 7, wherein the past performance information corresponds to communications between the mobile communication device and the communication network during a previous communication session between the mobile communication device and the communication network.

10. The mobile communication device of claim 7, wherein the past performance information corresponds to communications between the mobile communication device and the communication network during the past movement.

11. The mobile communication device of claim 7, wherein the communication profile comprises a schedule for the periodic polled communications for applications of the mobile communication device based on the projected path and the past performance information, wherein the periodic polled communications comprise communications initiated by the applications for periodic transfer of user data from the communication network to the mobile communication device.

12. The mobile communication device of claim 7, wherein the projected path comprises a path different than a path indicated by current momentum and direction of the mobile communication device.

13. A non-transitory computer-readable medium having program instructions stored thereon for operating a mobile communication device, that when executed by the mobile communication device, direct the mobile communication device to:

monitor a current movement of the mobile communication device;

identify a projected path of the mobile communication device based on the current movement and past mobility information corresponding to past movement of the mobile communication device; and process past performance information corresponding to past communication performance between the mobile communication device and a communication network on the projected path to determine a communication profile for the mobile communication device on the projected path, wherein the communication profile indicates communication performance at locations along the projected path:

if the communication performance at the locations along the projected path does not meet a predetermined communication service quality, then disable periodic polled communications initiated by different ones of applications of the mobile communication device; or    if the communication performance at the locations along the projected path does meet the predetermined communication service quality, then allow the periodic polled communications initiated by the different ones of applications of the mobile communication device.

14. The non-transitory computer-readable medium of claim 13, wherein the instructions further direct the mobile communication device to receive the current movement from a position sensor of the mobile communication device, and receive the past mobility information from a database comprising past movement data of the mobile communication device.

* * * * *